Oct. 24, 1944.   E. KENITZ   2,361,034
SOY BEAN CLEANER
Filed Sept. 14, 1942   2 Sheets-Sheet 2
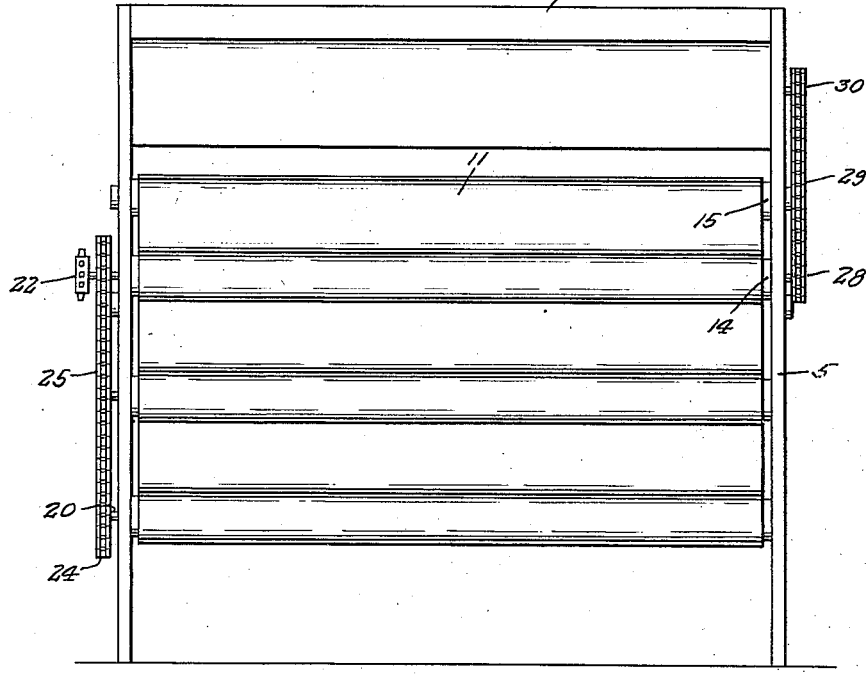
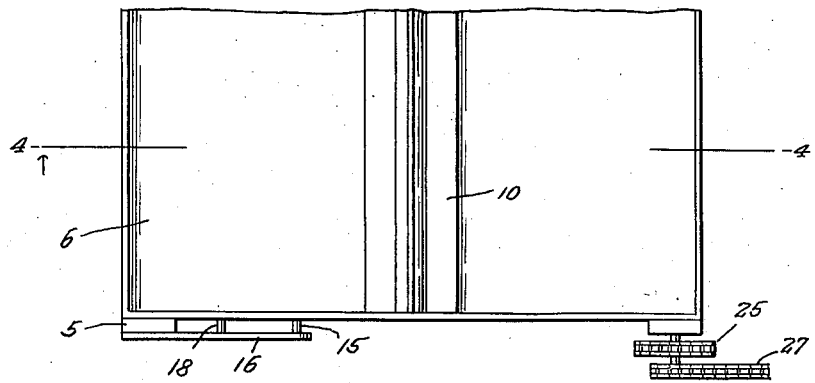

Patented Oct. 24, 1944

2,361,034

UNITED STATES PATENT OFFICE 2,361,034

SOYBEAN CLEANER

Ervin Kenitz, Elgin, Minn.

Application September 14, 1942, Serial No. 458,267

1 Claim. (Cl. 209—114)

The present invention relates to new and useful improvements in soy bean cleaning devices, and for other purposes, and has for its primary object to provide an apparatus of this character embodying a plurality of inclined endless belts arranged in superposed relation and adapted to convey the material to be cleaned from one belt to the other, the character of the material being such that the whole beans will roll downwardly on the belt and gravitate from the lower end thereof and the broken beans or foreign matter will be discharged from the other end of the belt onto a belt immediately therebeneath to continue the cleaning operation.

A further object is to provide an apparatus of this character of simple and practical construction, which is efficient and reliable in performance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 2 is an end elevational view.

Figure 3 is a fragmentary top plan view.

Figure 1:
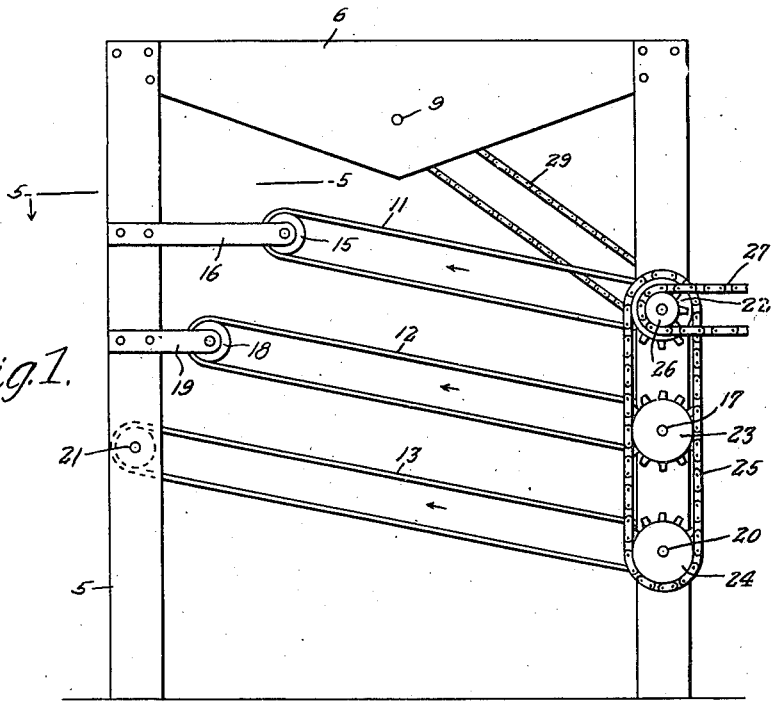
Figure 1 is a side elevational view.
Figure 4:
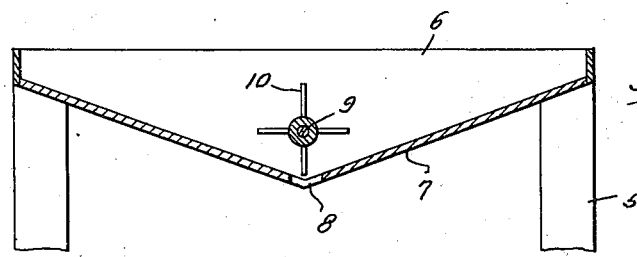
Figure 4 is a vertical sectional view through the hopper taken substantially on a line 4—4 of Figure 3.
Figure 5:
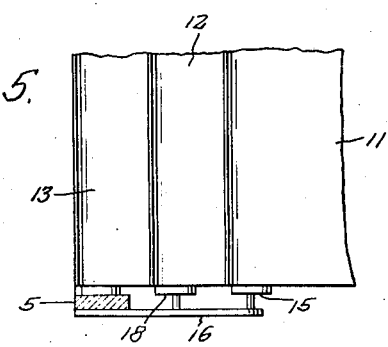
Figure 5 is a fragmentary sectional view taken substantially on a line 5—5 of Figure 1.

Referring now to the drawings in detail, wherein for the purpose of illustration I have disclosed a preferred embodiment of the invention, the numeral 5 designates a plurality of upright supports having a hopper 6 secured at their upper ends, the hopper having an inclined bottom 7 and provided with a discharge opening 8 extending transversely of the machine. A shaft 9 is journaled in the opposite sides of the hopper on which a feed device 10 is secured for rotation in the hopper to regulate the volume of seed or beans discharged through the opening.

Positioned beneath the hopper 6 is an upper endless belt 11, an intermediate endless belt 12 and a lower endless belt 13. As shown to advantage in Figure 1 of the drawings, the belts are arranged in vertically spaced relation and are inclined downwardly toward one end of the machine, the lower end of the belt 11 travelling on a roller 14 while the upper end of the belt 11 travels over a roller 15. The roller 14 is journaled between a pair of the supports 5, while the roller 15 is journaled in brackets 16 projecting inwardly from an opposite side of the machine.

The intermediate belt 12 likewise has its lower end adapted to travel over a roller 17 journaled in the supports 5 immediately below the roller 14 and the upper end of the belt 12 travels over a roller 18 journaled in brackets 19 projecting inwardly of the machine in spaced relation beneath the brackets 16.

The lower end of the belt 13 is arranged to travel over a roller 20 journaled in the supports immediately beneath the roller 17 and the upper end of the belt 13 is adapted to travel over a roller 21 journaled in the supports immediately beneath the brackets 19.

One end of the rollers 14, 17 and 20 are provided with sprockets 22, 23 and 24, respectively, connected for uniform rotation by a chain 25. The upper roller 14 also carries a sprocket 26 driven by a chain 27 from a suitable source of power.

On the opposite end of the roller 14 is also a sprocket 28 driving a chain 29 leading to a sprocket 30 on the shaft 9 for operating the feed device 10.

As will be observed from an inspection of Figure 1 of the drawings, the upper end of the upper belt 11 overlies the intermediate belt 12 and the upper end of the belt 12 similarly overlies the lower belt 13.

Accordingly, as the beans are discharged from the hopper onto the upper belt 11, the whole beans will roll downwardly toward the lower end of said belt for discharge therefrom into a suitable receptacle or elevator (not shown) while the broken beans or foreign substance will be moved upwardly by the belt for discharge from the upper end thereof onto the belt 12 where the separating action is repeated.

It is believed the details of construction, manner of operation and advantages of the device will be readily understood from the foregoing without further detailed explanation.

Having thus described the invention, what I claim is:

A separator of the class described comprising an upright support, rollers journaled in said support at one side thereof in a horizontal position one above the other, brackets in the form of strips of strap metal projecting inwardly at a relative opposite side of the support and including upper and lower sets of brackets, the upper brackets extending upwardly toward the center of the support beyond the lower brackets, rollers journaled in said brackets, endless belts mounted to travel on said rollers, said rollers being arranged to support the respective belts in an inclined position, the upper end of each upper discharge belt overlying an intermediate portion of a lower belt for depositing material directly onto the surface of an adjacent lower belt, means for operating the belts to cause an upward movement of the upper flights thereof, and a hopper supported above the uppermost belt and having an opening for discharging material thereon.

ERVIN KENITZ.